US008588848B2

(12) United States Patent
Kuang

(10) Patent No.: US 8,588,848 B2
(45) Date of Patent: Nov. 19, 2013

(54) METHOD OF USING HANDLE CORD OF A FIXED WIRELESS PHONE AS FM ANTENNA AND A FIXED WIRELESS PHONE

(75) Inventor: Xianliang Kuang, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 85 days.

(21) Appl. No.: 13/505,231

(22) PCT Filed: May 18, 2011

(86) PCT No.: PCT/CN2011/074214
§ 371 (c)(1),
(2), (4) Date: Apr. 30, 2012

(87) PCT Pub. No.: WO2012/022176
PCT Pub. Date: Feb. 23, 2012

(65) Prior Publication Data
US 2012/0214547 A1    Aug. 23, 2012

(30) Foreign Application Priority Data
Aug. 17, 2010   (CN) .......................... 2010 1 0256131

(51) Int. Cl.
*H04M 1/00*    (2006.01)
(52) U.S. Cl.
USPC .................... 455/556.1; 455/344; 455/183.2; 455/130
(58) Field of Classification Search
USPC ................. 455/344, 183.2, 130, 41, 277.1
See application file for complete search history.

(56) References Cited

U.S. PATENT DOCUMENTS

| 6,424,820 | B1* | 7/2002 | Burdick et al. ............... 455/41.1 |
| 6,658,267 | B1* | 12/2003 | Baranowski et al. ....... 455/556.1 |
| 2008/0233907 | A1* | 9/2008 | Ibrahim et al. ............. 455/183.2 |

FOREIGN PATENT DOCUMENTS

| CN | 1128452 A | 8/1996 |
| CN | 201178407 Y | 1/2009 |
| CN | 101924834 A | 12/2010 |
| CN | 201781540 U | 3/2011 |
| EP | 2077601 A1 | 7/2009 |

OTHER PUBLICATIONS

SIPO Office Action, dated Sep. 13, 2012, for CN priority application 201010256131.8, corresponding to the current U.S. Appl. No. 13/505,231.
PCT International Search Report, dated Aug. 25, 2011 for the current national stage U.S. Appl. No. 13/505,231.

* cited by examiner

*Primary Examiner* — David Q Nguyen
(74) *Attorney, Agent, or Firm* — Shimokaji & Associates P.C.

(57) ABSTRACT

The present invention relates to fixed wireless phones and describes a fixed wireless phone and a method of using a handle cord of a fixed wireless phone as a FM antenna. An FM antenna signal access point is disposed on one of the four wires connecting a baseband chip with the handle; a first ferrite bead is connected in series between the FM antenna signal access point and an output terminal of the baseband chip; a FM frequency selective circuit is lapped with the FM antenna signal access point; and the FM frequency selective circuit is connected with an FM chip. The method of using the handle cord of a fixed wireless phone as a FM antenna and the fixed wireless phone according to the present invention uses the handle cord of the fixed wireless phone as FM antenna and adds a corresponding frequency selective circuit.

20 Claims, 1 Drawing Sheet

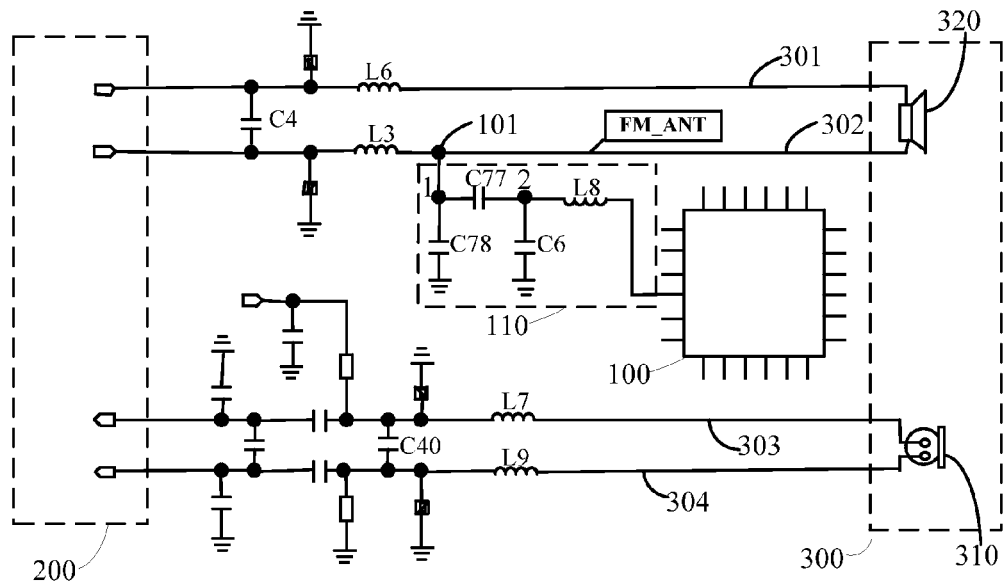

Fig. 1

Select one of the four wires of the handle cord that connect the microphone and the receiver of the handle of a fixed wireless phone with the baseband chip as FM antenna, dispose a FM antenna signal access point between said wire selected as FM antenna and the baseband chip, and connect a first ferrite bead in series between said FM antenna signal access point and the baseband chip — 910

Lap a FM frequency selective circuit on said FM antenna signal access point and connect said FM frequency selective circuit with a FM chip — 920

Fig. 2

METHOD OF USING HANDLE CORD OF A FIXED WIRELESS PHONE AS FM ANTENNA AND A FIXED WIRELESS PHONE

FIELD OF THE INVENTION

The present invention relates to fixed wireless phones and in particular, to a fixed wireless phone and a method of using a handle cord of a fixed wireless phone as an FM antenna.

DESCRIPTION OF THE RELATED ART

Along with the development of communications technologies, fixed wireless phones have become increasingly popular. Currently, it is common to see FM radio functions on fixed wireless phones. To add a separate FM telescopic antenna for a fixed wireless phone having an FM function, however, not only makes the fixed wireless phone ugly (since there has already been an antenna for the fixed wireless phone), but also increases the cost.

Therefore, the prior art is in need for improvement and development of fixed wireless phones.

SUMMARY OF THE INVENTION

The technical problem that the present invention is to solve is to provide a method of using handle cord of a fixed wireless phone as FM antenna and a fixed wireless phone that overcome the above drawback of the prior art and which has a simple structure, low manufacturing cost, and excellent FM reception property.

According to an aspect of the present invention, a fixed wireless phone having a FM function comprises a FM chip; a baseband chip; and a handle, the handle being connected with the baseband chip via four wires inside a handle cord, wherein a FM antenna signal access point is disposed on one of the four wires connecting the baseband chip with the handle; a first ferrite bead is connected in series between the FM antenna signal access point and an output terminal of the baseband chip; a FM frequency selective circuit is lapped with the FM antenna signal access point; and the FM frequency selective circuit is connected with the FM chip.

In some embodiments, the four wires inside the handle cord comprise two wires for connecting a transmitter and two wires for connecting a receiver, and the FM antenna signal access point is disposed on one of the two wires that are connected with the receiver.

In some embodiments, a second ferrite bead, a third ferrite bead, and a fourth ferrite bead are connected in series on three other wires of the four wires connecting the baseband chip and the handle.

In some embodiments, the first ferrite bead is a 2,500 ohm ferrite bead.

In some embodiments, the FM frequency selective circuit comprises a first capacitor, a second capacitor, a third capacitor and an inductor, wherein the first terminal of the first capacitor is connected with the FM antenna signal access point, and the second terminal of the first capacitor is connected with the FM chip via the inductor; and the first terminal of the first capacitor is further connected with a reference ground via the second capacitor, and the second terminal of the first capacitor is connected with the reference ground via the third capacitor.

In some embodiments, the FM chip is a RDA5802E chip.

According to another aspect of the present invention, a method of using a handle cord of a fixed wireless phone as FM antenna comprises selecting one of four wires of the handle cord that connect a transmitter and a receiver of a handle of the fixed wireless phone with a baseband chip as a FM antenna; disposing a FM antenna signal access point between the wire selected as the FM antenna and the baseband chip; connecting a first ferrite bead in series between the FM antenna signal access point and the baseband chip; lapping a FM frequency selective circuit on the FM antenna signal access point; and connecting the FM frequency selective circuit with a FM chip.

In some embodiments, the FM antenna signal access point is disposed on one of the two wires that are connected with the receiver According to a further aspect of the present invention, a fixed wireless phone comprises a handle connected with a baseband chip via four wires inside a handle cord; a FM antenna signal access point is disposed on one of the four wires connecting said baseband chip with said handle; and a first ferrite bead is connected in series between said FM antenna signal access point and an output terminal of said baseband chip.

The fixed wireless phone having the FM function includes the FM frequency selective circuit with a first capacitor, a second capacitor, a third capacitor and an inductor, the first terminal of the first capacitor is connected with the FM antenna signal access point, and the second terminal of the first capacitor is connected with the FM chip via the inductor.

Furthermore, the first terminal of the first capacitor is connected with a reference ground via the second capacitor, and the second terminal of the first capacitor is connected with the reference ground via the third capacitor.

The fixed wireless phone having the FM function includes a RDA5802E chip as the FM chip.

A method of using handle cord of a fixed wireless phone as FM antenna comprises the steps of selecting one of four wires of a handle cord that connects a transmitter and a receiver of a handle of a fixed wireless phone with a baseband chip as a FM antenna, disposing a FM antenna signal access point between the wire selected as FM antenna and the baseband chip, and connecting a first ferrite bead in series between the FM antenna signal access point and the baseband chip; lapping a FM frequency selective circuit on the FM antenna signal access point and connecting the FM frequency selective circuit with a FM chip.

The method of using handle cord of a fixed wireless phone as FM antenna further comprises disposing the FM antenna signal access point on one of the two wires that are connected with the receiver.

The method of using the handle cord of a fixed wireless phone as the FM antenna and the fixed wireless phone according to the present invention use the handle cord of a fixed wireless phone as the FM antenna and adds a corresponding frequency selective circuit which is capable of not only saving cost and preserving the appearance of the fixed wireless phone, but also achieving. an excellent reception property for the FM antenna.

DESCRIPTION OF THE DRAWINGS

FIG. 1 is an illustrative diagram of the fixed wireless phone having FM function according to an embodiment of the present invention; and FIG. 2 is the flow chart of the method of using handle cord of a fixed wireless phone as FM antenna according to an embodiment of the present invention.

DETAILED DESCRIPTION OF A PREFERRED EMBODIMENT

The method of using a handle cord of a fixed wireless phone as a FM antenna and the fixed wireless phone according to the present invention use the handle cord as FM antenna. The FM antenna has a bandwidth between 88 MHz~108 MHz, the central frequency point f0 is 98 MHz, while the wavelength $\lambda=c/f_0$. C is the velocity of light ($3\times10^8$ m/s). The wavelength of the central frequency point can be obtained through computation to be $\lambda=3.06$ m typical handle cord has a length of 3 m and is spiral with the length after twisting typically at 0.5 m, which is feasible to function as a FM antenna. To make the object, technology and advantages of the present invention more clearly understood, the present invention is further described in detail below with reference to the accompanying drawings and an embodiment. It should be understood that the specific embodiment described herein is only intended to explain the present invention, not to limit the present invention.

As shown in FIG. 1, a fixed wireless phone having a FM function according to an embodiment of the present invention comprises a FM chip 100, a baseband chip 200, and a handle 300, the handle 300 being connected with the baseband chip 200 via four wires inside the handle cord 301, 302, 303 and 304, wherein the handle 300 comprises a receiver 320 and a transmitter 310, the handle cord comprises wires connecting the handle and the baseband BB, the four wires of the handle cord comprise two wires 303 and 304 for connecting the transmitter 310 and two wires 301 and 302 for connecting the receiver 320.

To realize the circuit, one of the four wires that connect the baseband chip 200 with the handle 300 may be selected as the FM antenna FM_AMT. A FM antenna signal access point 101 may be disposed on the wire selected as the FM antenna. In the embodiment shown in FIG. 1, the FM antenna signal access point 101 is disposed on the wire 302 of the two wires that are connected with the receiver 320. Moreover, a first ferrite bead L3 is connected in series between the FM antenna signal access point 101 and the output terminal of the baseband chip 200 for suppressing high frequency noise and peak interference on the signal wire and the power cord, a FM frequency selective circuit 110 is lapped with the FM antenna signal access point 101, and the FM frequency selective circuit 110 is connected with the FM chip 100.

An exemplary embodiment is shown in FIG. 1, where a 2,500 ohm ferrite bead is connected in series on a wire 302 between the audio output terminal of the baseband chip 200 and the receiver 320 as the first ferrite bead L3 for preventing FM signals from flowing to the baseband chip 200 at the left of the FM antenna signal access point 101, such that FM signals flow to the frequency selective circuit 110 at the right of the FM antenna signal access point 101, and at the same time, preventing interference signals from the baseband chip 200 from flowing to the FM frequency selective circuit 110 at the right.

As shown in FIG. 1, the FM frequency selective circuit 110 comprises a first capacitor C77, a second capacitor C78, a third capacitor C6 and an inductor L8, the first terminal 1 of the first capacitor C77 is connected with the FM antenna signal access point 101, and the second terminal 2 of the first capacitor C77 is connected with the FM chip 100 via the inductor L8.

Furthermore, the first terminal 1 of the first capacitor C77 is further connected with a reference ground via the second capacitor C78, and the second terminal 2 of the first capacitor C77 is further connected with the reference ground via the third capacitor C6.

Typically, the FM chip 100 is a RDA5802E chip. In this way, the third capacitor C6, the first capacitor C77, the second capacitor C78 and the inductor L8 form a FM frequency selective circuit with the 50PF capacitor internal to the FM chip RDA5802E, wherein values of the capacitors C6, C77, C78 and the inductor L8 can be adjusted according to different FM chips.

To further improve the FM signal reception sensitivity, as shown in FIG. 1, a second ferrite bead L6, a third ferrite bead L7, and a fourth ferrite bead L9 are connected in series on three other wires 301, 303 and 304 of the four wires 301, 302, 303 and 304 connecting the baseband chip 200 and the handle 300, respectively. Since the four wires of the handle cord are parallel, interference signals from the baseband chip 200 will be coupled to the wire 302, FM_ANT, if the ferrite beads are not added, which could consequently affect the FM signal reception sensitivity.

From the above description, it can be seen that the embodiment of the present invention uses a handle cord as the FM antenna and adds a corresponding frequency selective circuit which is capable of not only saving cost and preserving the appearance of the fixed wireless phone, but also achieving an excellent reception property for the FM antenna. In the specific embodiment, the handle cord functions as the FM antenna by primarily adding two circuits. As shown in FIG. 1, one circuit is the 2,500 ohm ferrite bead L3 for preventing FM signals from flowing to the baseband chip 200 at the left, such that FM signals flow to the FM frequency selective circuit 110 at the right, and at the same time, preventing interference signals from the baseband chip 200 from flowing to the FM frequency selective circuit 110. The other circuit is the FM frequency selective circuit 110 formed by C77, C78, C6 and L8 with the 50PF capacitor internal to RDA5802E that is connected with the FM chip, thereby realizing the fixed wireless phone having FM function according to the present invention.

Based on the above fixed wireless phone having a FM function, the embodiment of the present invention further provides a method of using handle cord of the fixed wireless phone as the FM antenna, as shown in FIG. 2, which comprises the following steps.

Step S910. One of the four wires 301, 302, 303 and 304 of the handle cord that connect the transmitter 310 and the receiver 320 of the handle of a fixed wireless phone with the baseband chip 200 is selected as the FM antenna. A FM antenna signal access point 101 is disposed between the wire selected as FM antenna and the baseband chip 200, as shown in FIG. 1. The wire 302 out of two wires 301 and 302 that connect the receiver 320 is selected to dispose the FM antenna signal access point 101 thereon. A first ferrite bead L3 is connected in series between the FM antenna signal access point 101 and the baseband chip 200.

Step S920. A FM frequency selective circuit 110 is lapped on the FM antenna signal access point 101 and the FM frequency selective circuit 110 is connected with a FM chip 100.

The method of using the handle cord of a fixed wireless phone as the FM antenna and the fixed wireless phone according to the present invention use the handle cord of a fixed wireless phone as the FM antenna and add a corresponding frequency selective circuit which is capable of not only saving cost and preserving the appearance of the fixed wireless phone, but also achieving an excellent reception property for the FM antenna.

It should be understood that the present invention is not limited to the above embodiment. Those skilled in the art may make improvements or modifications according to the above description, while all these improvements and modifications shall be encompassed by the claims of the present invention.

What is claimed is:

1. A fixed wireless phone having a FM function, comprising:

a FM chip;
a baseband chip; and
a handle, said handle being connected with said baseband chip via four wires inside a handle cord, wherein
a FM antenna signal access point is disposed on one of the four wires connecting said baseband chip with said handle;
a first ferrite bead is connected in series between said FM antenna signal access point and an output terminal of said baseband chip;
a FM frequency selective circuit is lapped with said FM antenna signal access point; and
said FM frequency selective circuit is connected with said FM chip.

2. The fixed wireless phone as set forth in claim 1, wherein the four wires inside said handle cord comprise two wires for connecting a transmitter and two wires for connecting a receiver, and said FM antenna signal access point is disposed on one of the two wires that are connected with the receiver.

3. The fixed wireless phone as set forth in claim 1, wherein a second ferrite bead, a third ferrite bead, and a fourth ferrite bead are connected in series on three other wires of the four wires connecting said baseband chip and said handle.

4. The fixed wireless phone as set forth in claim 1, wherein said first ferrite bead is a 2,500 ohm ferrite bead.

5. The fixed wireless phone as set forth in claim 1, wherein:
the FM frequency selective circuit comprises a first capacitor, a second capacitor, a third capacitor and an inductor, wherein the first terminal of said first capacitor is connected with said FM antenna signal access point, and the second terminal of said first capacitor is connected with said FM chip via said inductor; and
the first terminal of said first capacitor is further connected with a reference ground via said second capacitor, and the second terminal of said first capacitor is connected with the reference ground via said third capacitor.

6. The fixed wireless phone as set forth in claim 1, wherein said FM chip is a RDA5802E chip.

7. A method of using a handle cord of a fixed wireless phone as FM antenna, the method comprising:
selecting one of four wires of the handle cord that connect a transmitter and a receiver of a handle of the fixed wireless phone with a baseband chip as a FM antenna;
disposing a FM antenna signal access point between said wire selected as the FM antenna and the baseband chip;
connecting a first ferrite bead in series between said FM antenna signal access point and the baseband chip;
lapping a FM frequency selective circuit on said FM antenna signal access point; and
connecting said FM frequency selective circuit with a FM chip.

8. The method of using the handle cord of the fixed wireless phone as the FM antenna as set forth in claim 7, further comprising disposing said FM antenna signal access point on one of the two wires that are connected with the receiver.

9. The method of using the handle cord of the fixed wireless phone as the FM antenna as set forth in claim 7, further comprising:
connecting a transmitter to two of the four wires of the handle cord; and
connecting a receiver to two of the four wires of the handle cord.

10. The method of using the handle cord of the fixed wireless phone as the FM antenna as set forth in claim 9, wherein the first ferrite bead is disposed between the audio output terminal of the baseband chip and the receiver.

11. The method of using the handle cord of the fixed wireless phone as the FM antenna as set forth in claim 7, further comprising connecting a second ferrite bead, a third ferrite bead, and a fourth ferrite bead in series on three other wires of the four wires connecting said baseband chip and said handle.

12. The method of using the handle cord of the fixed wireless phone as the FM antenna as set forth in claim 7, wherein said first ferrite bead is a 2,500 ohm ferrite bead.

13. The method of using the handle cord of the fixed wireless phone as the FM antenna as set forth in claim 7, further comprising:
connecting a first terminal of a first capacitor with said FM antenna signal access point; and
connecting a second terminal of the first capacitor with said FM chip via an inductor.

14. The method of using the handle cord of the fixed wireless phone as the FM antenna as set forth in claim 11, further comprising:
connecting the first terminal of the first capacitor with a reference ground via a second capacitor; and
connecting the second terminal of the first capacitor to the reference ground via a third capacitor.

15. A fixed wireless phone comprising:
a handle connected with a baseband chip via four wires inside a handle cord;
a FM antenna signal access point is disposed on one of the four wires connecting said baseband chip with said handle; and
a first ferrite bead is connected in series between said FM antenna signal access point and an output terminal of said baseband chip.

16. The fixed wireless phone as set forth in claim 15, further comprising:
a FM frequency selective circuit lapped with said FM antenna signal access point; and
said FM frequency selective circuit connected to an FM chip.

17. The fixed wireless phone as set forth in claim 15, wherein the four wires inside said handle cord comprise two wires for connecting a transmitter and two wires for connecting a receiver, and said FM antenna signal access point is disposed on one of the two wires that are connected with the receiver.

18. The fixed wireless phone as set forth in claim 17, further comprising a second ferrite bead, a third ferrite bead, and a fourth ferrite bead connected in series on three other wires of the four wires connecting said baseband chip and said handle.

19. The fixed wireless phone as set forth in claim 15, wherein a transmitter is connected to two of the four wires of the handle cord; and a receiver is connected to two of the four wires of the handle cord.

20. The fixed wireless phone as set forth in claim 19, wherein the first ferrite bead is disposed between the audio output terminal of the baseband chip and the receiver.

* * * * *